United States Patent
Guo et al.

(10) Patent No.: US 10,815,593 B2
(45) Date of Patent: Oct. 27, 2020

(54) VISCOSITY MODIFIED FORMALDEHYDE-FREE BINDER COMPOSITIONS

(71) Applicant: JOHNS MANVILLE, Denver, CO (US)

(72) Inventors: Zhihua Guo, Centennial, CO (US); Uranchimeg Lester, Littleton, CO (US); Jawed Asrar, Englewood, CO (US); Kiarash Alavi Shooshtari, Littleton, CO (US); Mingfu Zhang, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 327 days.

(21) Appl. No.: 13/675,414

(22) Filed: Nov. 13, 2012

(65) Prior Publication Data

US 2014/0134909 A1    May 15, 2014

(51) Int. Cl.
| | |
|---|---|
| *C09D 103/02* | (2006.01) |
| *C08L 3/02* | (2006.01) |
| *C08F 8/28* | (2006.01) |
| *C08L 61/32* | (2006.01) |
| *D04H 13/00* | (2006.01) |
| *D21H 13/40* | (2006.01) |
| *D04H 1/64* | (2012.01) |
| *C09J 101/28* | (2006.01) |

(Continued)

(52) U.S. Cl.
CPC ............ *D04H 13/008* (2013.01); *C08K 7/14* (2013.01); *C08L 3/02* (2013.01); *C08L 61/20* (2013.01); *C08L 61/24* (2013.01); *C08L 61/32* (2013.01); *C09J 101/28* (2013.01); *C09J 101/286* (2013.01); *C09J 103/02* (2013.01); *C09J 105/00* (2013.01); *D04H 1/4218* (2013.01); *D04H 1/4242* (2013.01); *D04H 1/587* (2013.01); *D04H 1/64* (2013.01); *D21H 13/40* (2013.01);

(Continued)

(58) Field of Classification Search
CPC ...... C08F 251/00; C08F 251/02; B32B 17/04; B32B 27/00; B32B 27/04; C03C 25/321; C03C 25/24–40
USPC .......................................................... 442/331
See application file for complete search history.

(56) References Cited

U.S. PATENT DOCUMENTS

| | | | | | |
|---|---|---|---|---|---|
| 4,295,846 | A | * | 10/1981 | Petersen | ............. D06M 15/423 427/389.9 |
| 4,345,063 | A | * | 8/1982 | North | ............................. 528/245 |

(Continued)

FOREIGN PATENT DOCUMENTS

| | | | | |
|---|---|---|---|---|
| EP | 0402072 | A2 | * 12/1990 | ............. D04H 1/641 |
| EP | 2230222 | A1 | * 9/2010 | |
| WO | 2011/019597 | A1 | 2/2011 | |

OTHER PUBLICATIONS

Shooshtari et al. WO 2011/019597 A1. Curable Fiberglass Binder Comprising Amine Salt of Inorganic Acid. Feb. 17, 2011.*

(Continued)

*Primary Examiner* — Marla D McConnell
*Assistant Examiner* — Kevin Worrell
(74) *Attorney, Agent, or Firm* — Robert D. Touslee

(57) ABSTRACT

Viscosity-modified carbohydrate binder compositions are described. The binder compositions may include a carbohydrate, a nitrogen-containing compound, and a thickening agent. The binder compositions may have a Brookfield viscosity of 7 to 50 centipoise at 20° C. The thickening agents may include modified celluloses such as hydroxyethyl cellulose (HEC) and carboxymethyl cellulose (CMC), and polysaccharides such as xanthan gum, guar gum, and starches.

16 Claims, 4 Drawing Sheets

(51) Int. Cl.

| | | |
|---|---|---|
| *D04H 1/4242* | (2012.01) | |
| *C09J 103/02* | (2006.01) | |
| *D21H 17/20* | (2006.01) | |
| *C09J 105/00* | (2006.01) | |
| *C08L 61/24* | (2006.01) | |
| *D21H 23/48* | (2006.01) | |
| *C08L 61/20* | (2006.01) | |
| *D04H 1/587* | (2012.01) | |
| *D04H 1/4218* | (2012.01) | |
| *C08K 7/14* | (2006.01) | |

(52) U.S. Cl.
CPC ............. *D21H 17/20* (2013.01); *D21H 23/48* (2013.01); *Y10T 442/604* (2015.04)

(56) References Cited

U.S. PATENT DOCUMENTS

| | | | | |
|---|---|---|---|---|
| 4,705,570 | A | * | 11/1987 | Paul et al. ................ 106/150.1 |
| 4,814,012 | A | * | 3/1989 | Paul et al. ................ 106/38.51 |
| 6,153,668 | A | * | 11/2000 | Gestner et al. ................ 523/179 |
| 7,662,258 | B2 | | 2/2010 | Nandi et al. |
| 7,691,761 | B2 | | 4/2010 | Nandi et al. |
| 7,964,060 | B2 | | 6/2011 | Nandi et al. |
| 7,964,061 | B2 | | 6/2011 | Nandi et al. |
| 8,257,554 | B2 | | 9/2012 | Poggi et al. |
| 2004/0039098 | A1 | * | 2/2004 | Belmares et al. ............ 524/449 |
| 2007/0027283 | A1 | * | 2/2007 | Swift et al. .................... 527/312 |
| 2007/0292618 | A1 | * | 12/2007 | Srinivasan et al. ........... 427/384 |
| 2008/0082151 | A1 | * | 4/2008 | Quincy et al. .................. 607/96 |
| 2008/0160854 | A1 | | 7/2008 | Nandi et al. |
| 2011/0054098 | A1 | * | 3/2011 | Tutin ....................... C09K 3/22 524/272 |

OTHER PUBLICATIONS

Eckert et al. (WO 2011/019598 A1). Curable Fiberglass Binder. Feb. 17, 2011.*

* cited by examiner

VISCOSITY MODIFIED FORMALDEHYDE-FREE BINDER COMPOSITIONS

FIELD OF THE INVENTION

Modified carbohydrate-containing binder compositions with thickening agents are described. The binder compositions are useful to adhere together fibers, such as glass fibers, in processes of making binder-containing fiber composites, such as glass mats.

BACKGROUND OF THE INVENTION

For decades urea formaldehyde (UF) binder compositions have been used to make glass fiber mats for building materials, including insulation, flooring, siding, facers, and roofing shingles. UF binders were favored for these materials because of their low cost and acceptable strength properties. For materials like roofing shingles, the UF in the binder compositions were often blended with more flexible latex polymers such as polyvinyl acetate, vinyl acrylic and/or styrene butadiene polymers. The latexes in the binders gave the shingles increased tensile and tear strength, as well as improved their moisture resistance properties.

More recently, the construction industry has moved away from formaldehyde-based binder compositions. Formaldehyde is considered a probable human carcinogen, as well as an irritant and an allergen, and its use in binder formulations for building products, textiles, upholstery, and other materials is increasingly restricted. Thus, makers of building materials have been developing alternative binder formulations that are formaldehyde free.

One alternative binder system that has received considerable attention includes the polymerization of carbohydrates (i.e., sugars) with amine compounds to make a binder that is insoluble in water and adheres well to glass fibers. In addition to being formaldehyde-free, these carbohydrate-based binder formulations can be made from renewably grown natural sugars instead of non-renewable, petroleum-based feedstocks.

Carbohydrate-based binder compositions have been used as the binder component of fiberglass bat insulation for houses and buildings. This type of insulation is typically made by drawing molten streams of glass into fibers of random lengths by blowing them in a forming chamber and randomly depositing them onto a moving conveyor belt below the chamber. The carbohydrate-based binder composition is sprayed on the fibers as they move on the conveyor belt. The binder is commonly dried and cured by flowing air over the binder-coated fibers, which are still hot after just being formed.

The relatively low viscosity of the carbohydrate-based binder compositions have not been a problem in the production of blown fiberglass bat insulation which is sprayed in relatively low concentrations and quickly dried and cured. However, the low viscosity of these binder compositions has created more difficulties in the production of glass fiber mats, where too much of the free-flowing binder can migrate to the bottom of the mat leaving the fibers on top with too little binder coverage.

The aqueous, carbohydrate-based binder compositions are typically diluted in significant quantities of water when sprayed onto the glass fiber mat, so one approach to increasing their viscosity has been to concentrate the carbohydrate and amine precursors in less water. However, this approach brings significant challenges for the process control of mat manufacturing. Typically, a binder with less than 20 wt. % solids is used to achieve an loss-on-ignition (LOI) of 15-25 wt. % on a glass mat. A significant increases in the wt. % solids in the binder leads to difficulties for the control of the mat weight and especially LOI. In addition, a higher wt. % solids in some cases may result in a non-uniform coating of the mat. Thus, there is a need for new approaches to increase the viscosity of these binder compositions. Thus, there is a need for new approaches to increase the viscosity of carbohydrate-based binder compositions. This and other issues are explored in the present application.

BRIEF SUMMARY OF THE INVENTION

Carbohydrate binder compositions with modified rheology are described that include the carbohydrates, a nitrogen-containing crosslinking agent, and a thickening agent. These binder compositions may be used as formaldehyde-free substitute binders to make glass fiber mats that are incorporated into a variety of products including building materials (e.g., glass fiber reinforced roofing shingles; facers for insulation, office partition panels; backing mat for flooring and/or carpets; etc.), battery separators, and filtration media for air, water, and oil, among other materials.

The thickening agent (or thickener) is used to increase the viscosity of the binder composition to a level where the composition is distributed more evenly between the top and bottom sides of the glass fiber mats. When the viscosity of the binder composition is too low (e.g., less than 3 centipoise (cPs) as measured with a Brookfield viscometer using spindle 18 at 60 rpm and 20° C.) the liquid binder tends to migrate too quickly towards the bottom side of the mat and leaves the top side without adequate binder coverage. The inadequate binder coverage on top can have a number of deleterious effects on the finished mat, including reduced laminate strength and total tensile strength.

The present thickening agents are added in quantities that increase the overall viscosity of the binder composition to 7 to 50 cPs as measured with a Brookfield viscometer using spindle 18 at 60 rpm (shear rate ~79.2 $s^{-1}$) at room temperature (i.e., 20° C.). These thickening agents may include modified celluloses and polysaccharides, among others.

Present embodiments include carbohydrate binder compositions comprising a carbohydrate, a nitrogen-containing compound, and a thickening agent. The binder compositions may have a Brookfield viscosity (spindle 18 at 60 rpm) of 7 to 50 centipoise at 20° C.

Present embodiments may further include process of making a non-woven glass fiber mat. The processes may include the step of forming an aqueous dispersion of fibers. The dispersion may be passed through a mat forming screen to form a wet mat. The carbohydrate binder composition may be applied to the wet mat to form a binder-containing wet mat, and the binder-containing wet mat may be cured to form the non-woven glass fiber mat. The carbohydrate binder composition includes a carbohydrate, a nitrogen-containing compound, and a thickening agent, and wherein the carbohydrate binder composition has a Brookfield viscosity (spindle 18 at 60 rpm) of 7 to 50 centipoise at 20° C.

Another exemplary processes of making a non-woven glass fiber mat includes making a slurry of glass fiber by adding the fiber to white water in a pulper. The white water disperses the fiber in the slurry, which may have a fiber concentration of about 0.2-1.0 weight %. The slurry may be metered into a flow of white water and the metered mixture may be deposited on to a wire mesh moving screen to dewater and form a wet nonwoven fibrous mat. The wet nonwoven mat of glass fiber may then be transferred to a second moving screen and run through a binder application saturating station where a carbohydrate binder composition having a Brookfield viscosity (spindle 18 at 60 rpm) of 7 to 50 centipoise at 20° C. may be applied to the mat. This may be followed by sucking off the excess binder and drying the unbounded, wet mat and curing (polymerizing) the binder which bonds the fibers together in the mat.

The carbohydrate binder composition may be applied by a number of techniques, including a curtain coating, a dip and squeeze techniques, and spraying. The wet mat may be dried and cured in an oven at a binder curing temperature (e.g., 250-500° F.). Drying and curing times may range from seconds (e.g., 2-10 seconds) to minutes (e.g., 1-2 minutes).

Alternative mat-forming processes may also be used, such as cylinder forming and "dry laying" using carding or random fiber distribution. Aspects of these processes are described in U.S. Pat. Nos. 4,112,174; 4,681,802; and 4,810,576, the entire contents of which are herein incorporated by reference for all purposes.

Present embodiments may still further include glass fiber mats having glass fibers and a binder. The binder has cured products from a carbohydrate binder composition that includes a carbohydrate, a nitrogen-containing compound, and a thickening agent. The carbohydrate binder composition has a Brookfield viscosity (spindle 18 at 60 rpm) of 7 to 50 centipoise at 20° C. when applied to the glass fibers of the glass fiber mat.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
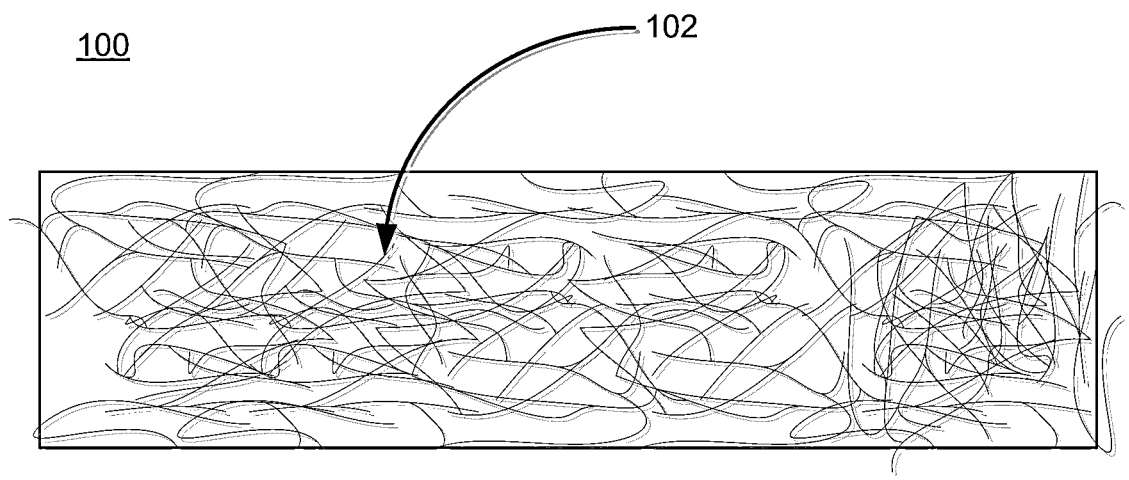
FIG. 1 shows an exemplary cross-section of glass fiber mat according to embodiments of the invention.

Controlling the rheological behavior of carbohydrate-containing binder compositions permits more uniform distributions of the compositions when used as adhesive binder formulations for glass fiber mat products. Viscosity-enhanced carbohydrate binder compositions address, among other problems, the rapid migration of the liquid binder composition towards the bottom portion of the glass fiber mat when using, for example, a falling-film curtain coater binder application technique. Thickening agents added to the carbohydrate binder compositions allow control of the binder composition's viscosity and surface tension when applied to a fiber mat, permitting a more controlled distribution of the binder composition through the entire thickness of the mat. A more homogeneous distribution of the binder in the final fiber mat product has been shown to improve a variety of the mat's properties, including tensile and tear strength in both the machine and cross-machine directions, and delamination strength, among other properties.

Exemplary Binder Compositions and their Rheological Properties

The present carbohydrate binder compositions may include one or more types of carbohydrate, nitrogen-containing compounds, and thickening agents, among other binder components. When the binder compositions are cured, the carbohydrates and nitrogen-containing compounds form a crosslinked polymer that in some instances is referred to as a Maillard polymerization product. Thickening agents are selected that create little or no interference with the crosslinking reaction of the polymer precursors so that the binder composition can be thoroughly and quickly cured after deposition on the fiber substrate (e.g., a glass fiber mat).

Exemplary thickening agents are added to control the viscosity of the binder compositions that are ultimately cured to make the adhesive binder component of the fiber product. The thickening agents may be polymeric materials and may be partially or fully water soluble. They are selected to enhance the binder compositions rheological properties (e.g., increase the composition's viscosity and surface tension) without substantially interfering with the composition's curability into an adhesive binder for the substrate fibers. Exemplary thickening agents may include polysaccharides, such as xanthan gum, guar gum, modified starches and the like; neutralized polyacrylic acid, such as sodium polyacrylate, modified celluloses, such as hydroxyethyl cellulose (HEC), carboxymethyl cellulose (CMC), as well as their soluble salts, polyacrylamides, and polyvinyl alcohols. The exemplary thickening agents may have a weight average molecular weight typically from 100,000 to 2,000,000 g/mol (e.g., 200,000 to 1,000,000 g/mol). The thickening agent (or agents) are typically added to the binder composition prior to its deposition on the fiber substrate, or alternatively may be added separately and approximately simultaneously with the other components of the binder composition to the fiber substrate.

The concentration of thickening agent in the binder composition may depend in part on the concentration of the other binder components in the composition. The carbohydrate binder compositions may be aqueous mixtures or solutions, and their viscosities depend in part on the how much the polymer precursors have been diluted by the water. For example, some concentrated binder compositions (e.g., solids concentrations of 45 to 70 wt. % or more) may have viscosities in the hundreds of centipoise at room temperature. The concentrated resins are typically diluted with water to, for example, a solids concentration of 10 to 30 wt. % solids (e.g., 10 to 20 wt. % solids), reducing the binder composition's viscosity to less than 3 cPs at room temperature. Other binder compositions may have functional viscosities at high concentrations (e.g., 20 cPs at 50 wt. % solids concentration) but should be diluted to address processing challenges such as LOI, weight, and uniformity problems for the applied binder composition.

Thickening agents may be added to increase the viscosity of the aqueous binder composition to a range of 7 to 50 cPs at room temperature (i.e., 20° C.), as measured by a Brookfield viscometer operating at a speed of 60 revolutions per minute. Typically, binder composition viscosities in this range can be achieved at thickening agent concentrations between 0.03 to 0.3 wt. % of the total composition. The concentration range of thickening agent can depend on the type of agent used. For example, adding hydroxyethyl cellulose to a concentration range of 0.05 to 0.3 wt. % may be sufficient to increase the composition's viscosity into a 7 to 50 cPs range. The same viscosity range may be met by adding 0.03 wt. % to 0.2 wt. % xanthan gum to the aqueous binder composition.

In addition to the thickening agents, the binder compositions may also contain a surfactant that provides more precise control over the surface tension of the composition. The surfactant may be added in amounts to achieve a surface tension for the binder composition of 35 to 50 mN/m (e.g., 38 to 48 mN/m, 40 to 47 mN/m, etc.). These surfactants may include cationic, anionic, and/or non-ionic surfactants.

The binder formulations of the binder compositions may include one or more types of carbohydrates and nitrogen-containing compounds. The nitrogen-containing compounds may act as crosslinking agents for the carbohydrates in the cured binder. The carbohydrates used in the binder formulations may include reducing sugars that contain at least one aldehyde group, or are capable of forming an aldehyde group through isomerization. Exemplary reducing sugars may include glucose (dextrose), fructose, glyceraldehyde, galactose, allose, xylose, ribose, maltose, cellobiose, and lactose, among others.

The nitrogen-containing compounds may include a variety of compounds that can distinguish the class of binder formulation. One class of binder formulations uses an amino-amide as the nitrogen containing compound, which itself is a reaction product of an amine with a saturated or unsaturated reactant. Another class of binder formulations has as the nitrogen-containing compound a reaction product of a urea compound and aldehyde-containing compound. Each of these classes of nitrogen-containing compounds are described more detail below.

1. Carbohydrate/Amino-Amide Binder Formulations

The nitrogen-containing compounds may include amines capable of undergoing conjugate addition with a saturated or unsaturated reactant to form an amino-amide. The amino-amide then reacts during curing with the carbohydrate to form a polyimide. The amino-amide addition products may be formed by mixing the amine and saturated or unsaturated reactant in an aqueous medium at room temperature. The resulting addition products are either water-soluble, water-dispersible, or are present as an emulsion. In some binder formulations, the formation of the amino-amide from the reaction of the amine precursor with the saturated or unsaturated reactant may occur before the introduction of the carbohydrate, while other formulations mix all three precursors (i.e., the amine, saturated or unsaturated reactant, and carbohydrate) before the amino-amide is formed.

Each amine may have two or more primary and/or secondary amine groups to react and crosslink two or more carbohydrate molecules. The amines may include aliphatic, cycloaliphatic and aromatic amines. They may be linear or branched, and have additional functionalities and linkages such as alcohols, thiols, esters, amides, acids, and ethers, among others. Exemplary amines may include 1,2-diethylamine, 1,3-propanediamine, 1,4-butanediamine, 1,5-pentanediamine, 1,6-hexanediamine, diaminoxylene, diethylenetriamine, triethylenetetramine, tetraethylenepentamine, as well as combinations of two or more of these amines. Natural and synthetic amino acids such as lysine, anginine, hestidine, etc., may also be used.

The curable amino-amide is formed through the selection of an unsaturated or saturated reactant that is an anhydride, carboxylic acid, ester, and salts and mixtures of such reactants. These unsaturated reactants may include maleic acid, fumaric acid, maleic anhydride, mono- and di-esters of maleic acid and fumaric acid, and salts and mixtures of these. Ammonium salts of the unsaturated acids of their monoesters conveniently can be utilized. Saturated reactants may include, without limitation, succinic anhydride, succinic acid, mono and diesters of succinic acid, glutaric acid and anhydride, phthalic acid and anhydride, tetrahydro phthaic acid and anhydride, mono and diesters of acid anhydrides and salts of the acids, and their mono esters.

In some formulations, the amino-amide product may be oligomerized before reacting with the carbohydrate. This oligomerization may be facilitated by heating the amino-amide solution until the amino-amide is dimerized, trimerized, tetramerized, etc., into the amino-amide oligomer. The heating conditions may include raising the temperature of the amino-amide solution to, for example, 120° C. to 150° C. for a time of up to 5 hours. In some instances, the oligomerized amino-amide product forms a stronger, more rigid cured binder product than then amino-amide monomer.

Then during the binder curing step, the majority of the carbohydrate reacts with the amino-amide intermediate, which contains an amic acid functional group, (i.e., an amide linkage in the vicinity of a carboxylic acid). An amic acid functional group is typically more reactive than a simple carboxylic acid. The amount of carbohydrate added is generally such that the molar ratio of carboxylic acid in the amino-amide to carbonyl or ketone in the carbohydrate is from 1:5 to 50:1, for example a ratio of 1:20 to 20:1, or a ratio of 1:10 to 10:1. Additional details about carbohydrate/amino-amide binder formulation are described in co-assigned U.S. patent application Ser. No. 12/539,263 to Shooshtari et al, filed Aug. 11, 2009, and titled "Curable Fiberglass Binder," the entire contents of which are herein incorporated by reference for all purposes.

2. Carbohydrate/Urea Derivative Binder Formulations

The nitrogen-containing compounds may include urea derivative reaction products of urea (i.e., $H_2N-CO-NH_2$), and/or substituted ureas, with diformaldehyde compounds such as glyoxal. One specific class of these urea derivatives include imidazolidine compounds such as 4,5-dihydroxy-imidazolidin-2-one, which has the chemical structure:

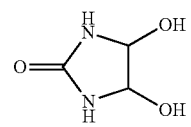

4,5-dihydroxyimidazolidin-2-one

More specifically, the urea compound may be a substituted our unsubstituted urea having the formula:

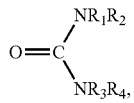

where $R_1$, $R_2$, $R_3$, and $R_4$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include —ROH, where R may be a substituted or unsubstituted, saturated or unsaturated, branched or unbranched, cyclic or acyclic, organic moiety. For example, R may be —(CH2)$_n$—, where n may be 1 to 12. Exemplary alcohols may also include polyols having two or more hydroxyl groups (—OH) in alcohol group. Exemplary aldehyde groups include —RC(=O)H, where R may be a monovalent functional group (e.g., a single bond), or a substituted or unsubstituted, saturated or unsaturated, branched or unbranched, cyclic or acyclic, organic moiety, such as —(CH2)$_n$—, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —OR$_x$, where R$_x$ is an alkyl group.

The aldehyde-containing compound may contain one or more aldehyde functional groups. Exemplary aldehyde-containing compounds include acetaldehyde, propanaldehyde, butyraldehyde, acrolein, furfural, glyoxal, gluteraldehyde, and polyfurfural among others. Exemplary aldehyde-containing compounds may also include substituted glyoxal compounds having the formula:

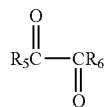

where $R_5$ and $R_6$ may be independently hydrogen (H), an alkyl group, an aromatic group, an alcohol group, an aldehyde group, a ketone group, a carboxylic acid group, and an alkoxy group, among other groups.

The reaction products of the urea compound and the aldehyde-containing compound may include an imidazolidine compound having the formula:

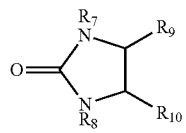

where $R_7$, $R_8$, $R_9$, and $R_{10}$ are independently, —H, —OH, —NH$_2$, an alkyl group, an aromatic group, an alcohol group, an aldehyde group, a ketone group, a carboxylic acid group, and an alkoxy group. In one specific example of the reaction between urea and glyoxal, the reaction product may be 4,5-dihydroxyimidazolidin-2-one.

The carbohydrate/urea derivative binder formulations may also include one or more catalysts to increase the rate of the crosslinking reactions between the carbohydrates and crosslinking agents when the composition is exposed to curing conditions. Exemplary catalysts may include alkaline catalysts and acidic catalysts. The acidic catalysts may include Lewis acids (including latent acids and metallic salts), as well as protic acids, among other types of acid catalysts. Lewis acid catalysts may include a salt of a deprotonized anion such as a sulfate, sulfite, nitrate, nitrite, phosphate, halide, or oxyhalide anion in combination with one or more metallic cations such as aluminum, zinc, iron, copper, magnesium, tin, zirconium, and titanium. Exemplary Lewis acid catalysts include aluminum sulfate, ferric sulfate, aluminum chloride, ferric chloride, aluminum phosphate, ferric phosphate, and sodium hypophosphite (SHP), among others. Exemplary latent acids include acid salts such as ammonium sulfate, ammonium hydrogen sulfate, mono and dibasic ammonium phosphate, ammonium chloride, and ammonium nitrate, among other latent acid catalysts. Exemplary metallic salts may include organo-titanates and organo-zirconates (such as those commercially manufactured under the tradename Tyzor® by DuPont), organo-tin, and organo-aluminum salts, among other types of metallic salts. Exemplary protic acids include sulfuric acid, phosphoric acid, hydrochloric acid, nitric acid, sulfonic acid compounds (i.e., R—S(=O)$_2$—OH) such as p-toluenesulfonic acid and methanesulfonic acid, and carboxylic acids, among other protic acids. Catalyst compositions may also include combinations of two or more catalysts, for example the combination of ammonium sulfate and diammonium phosphate.

The pH of the present binder compositions may vary depending upon the types and relative concentrations of the components used. Typically the pH of the present binder compositions are slightly acidic to alkaline with a pH range of about 6 to 8 (e.g., 6.5 to 7.5). The binder compositions have a pH that creates relatively little or no acid-based corrosion of metal fabrication equipment.

The reaction product of the urea derivative nitrogen-containing compound acts as a crosslinking agent for the carbohydrate. During a curing stage, the urea derivative can bond to two or more carbohydrates (either polymerized or unpolymerized) to form a crosslinked, polymeric cured binder.

The molar ratio of the (1) crosslinking reaction product of the urea compound and the aldehyde-containing compound to (2) the carbohydrate generally ranges from 1:2 to 1:50. Exemplary ratios of crosslinking agent to carbohydrate include a range from 1:4 to 1:10. Additional details about carbohydrate/urea derivative binder formulations are described in co-assigned U.S. patent application Ser. No. 13/490,638 to Shooshtari et al, filed Jun. 7, 2012, and titled "Formaldehyde-Free Binder Compositions with Urea-Formaldehyde Reaction Products," the entire contents of which are herein incorporated by reference for all purposes.

3. Carbohydrate/Nitrogen-Containing Salt Binder Formulations i. Salts of Inorganic Acids with Amines In additional carbohydrate binder formulations, the nitrogen-containing compounds may include a nitrogen-containing salt. For example, the nitrogen-containing compound may include the salt product of the combination of an inorganic acid and an amine (e.g., an amine-acid salt). Exemplary inorganic acids may include a phosphorous-containing acid such as phosphoric acid, pyrophosphoric acid, phosphorous acid, and phosphine, among others. Exemplary inorganic acids may also include oxygenated inorganic acids such as sulfuric acid, sulfurous acid, nitric acid, boric acid, hypochloric acid, chlorate acid, among others. They may also include non-oxygenated inorganic acids such as hydrochloric acid and hydrogen sulfide, among others.

Exemplary amines may include polyamines (e.g., diamines, triamines, etc.) having at least one primary amine group. For example, the amines may include ethylene diamine, 1,3-propanediamine, 1,4-butanediamine, 1,5-pentanediamine, 1,6-hexanediamine, α,α'-diaminoxylene, diethylenetriamine, triethylenetetramine, tetraethylenepentamine, as well as combinations of two or more of these amines.

When the amine-acid salt reacts with the carbohydrate under binder curing conditions the binder is formed. Exemplary binder systems include the combination of an amine-acid salt of 1,6-hexanediamine and phosphoric acid with the carbohydrate dextrose (HPD), the combination of an amine-acid salt formed from the combination of ethylene diamine and phosphoric acid with dextrose (EPD). Additional details about these amine-acid salt and carbohydrate binder formulations are described in co-assigned U.S. patent application Ser. No. 12/539,211, filed Aug. 11, 2009 to Shooshtari, the entire contents of which are herein incorporated by reference for all purposes.

ii. Salts of Inorganic Acids with Amines and Organic Species

Some carbohydrate/amine-acid salt binder formulations further include some combination of an organic acid, organic anhydride, and/or an alkanol amine. Exemplary organic acids may include polycarboxylic acid such as citric acid and or maleic acid. Exemplary organic anhydrides may include maleic anhydride, phthalic anhydride, methylphthalic anhydride, glutaric anhydride, tetrahydrophthalic anhydride, perhydrophthalic anhydride, itaconic anhydride, succinic anhydride, and trimellitic anhydride, among other anhydrides.

Exemplary alkanol amines may have the formula:

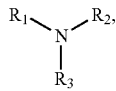

where $R_1$, $R_2$, and $R_3$ are independently chosen from, a hydrogen, a $C_{1-10}$ alkyl group, an aromatic group, and a $C_{1-10}$ hydroxy alkyl group, and wherein at least one of $R_1$, $R_2$, and $R_3$ is a hydroxyl alkyl group.

Specific examples of alkanol amines may include methanol amines such as mono-, di-, and tri-, methanol amine; ethanol amines such as monoethanol amine (MEA), diethanol amine (DEA), and triethanol amine (TEA); isopropanol amines such as mono-, di-, and tri-, isopropanol amine; methyldiethanol amine; ethyldiethanol amine; propyldiethanol amine; isopropyldiethanol amine; and n-butyldiethanol amine, among others.

Exemplary carbohydrate binder formulations may include the combination of a carbohydrate, amine-acid salt, and organic acid. These include binder formulations of dextrose, ethylene diamine phosphate, and citric or maleic acid. Additional details about these carbohydrate/amine-acid salt/ organic acid binder formulations are described in co-assigned U.S. patent application Ser. No. 13/478,765, filed May 23, 2012 to Shooshtari et al, the entire contents of which are herein incorporated by reference for all purposes.

Exemplary carbohydrate binder formulations may also include the combination of a carbohydrate, amine-acid salt, organic anhydride, and alkanol amine. This include binder formulations of the reaction products of monoethanol amine ("E") and maleic anhydride ("M") combined with ethylenediamine phosphate ("EP") and dextrose ("D") to make binder compositions referred to as EMEPDs. In still other exemplary binder formulations, the amine-acid salt may be eliminated. This includes formulations of the reaction products of monoethanol amine ("E") and maleic anhydride ("M") with the carbohydrate dextrose to make binder compositions referred to as EMDs. Additional details about these carbohydrate/amine-acid salt/anhydride-alkanol amine binder formulations are described in co-assigned U.S. patent application Ser. No. 13/559,769, filed Jul. 27, 2012 to Shooshtari et al, the entire contents of which are herein incorporated by reference for all purposes.

Exemplary binder formulations may include additional compounds combined with the reducing sugar, organic acid, and amine salt of an inorganic acid. For example, urea may also be included with the other binder components. Exemplary, urea-containing binder compositions may include ethylene diamine phosphate ("EP"), citric acid ("C"), urea ("U"), and dextrose ("D") combined to make a binder composition referred to as EPCUD. Exemplary molar ratios of these components may include Ethylenediamine:Phosphoric Acid:Citric Acid:Urea:Dextrose of 1:1:0.5:1:6.

iii. Ammonium Salts of Carboxylic Acids

In still additional carbohydrate binder formulations, the nitrogen-containing compounds may include an ammonium salt of a polycarboxylic acid. Exemplary ammonium salts of polycarboxylic acids may be formed from the reaction of ammonia ($NH_3$) with the polycarboxylic acid to form the ammonium salt. It should be appreciated that other types of ammonium ions can function as the cation in the ammonium-polycarboxylate salt, such as $(NH_3R_1)^+$, $(NH_2R_1R_2)^+$, and $(NHR_1R_2R_3)^+$, where $R_1$, $R_2$, and $R_3$ are each independently chosen from an alkyl, cycloalkyl, alkenyl, cycloalkenyl, hetrocyclyl, aryl, and heteroaryl, among other organic groups.

Exemplary polycarboxylic acids may include dicarboxylic acids, tricarboxylic acids, etc. Dicarboxylic acids may include maleic acid, and tricarboxylic acids may include citric acid.

The binder formulations may include the combination of a carbohydrate (e.g., a reducing sugar) with the ammonium salt of the polycarboxylic acid. For example, the binder composition may include dextrose and triammonium citrate.

4. Carbohydrate Blends with Latex and/or Solution Polymers

This group of carbohydrate binder compositions is distinguished by the inclusion of the components of a second binder in the formulation. The second binder may be a latex binder and/or solution polymer with a significantly higher viscosity than the carbohydrate binder composition. In some instances, the second binder may act as the sole thickening agent in the carbohydrate binder composition, while in other instances the second binder may complement other thickening agents to get the composition to a target viscosity.

The second binder may include latex binders having a Brookfield viscosity of about 100 cPs or more (spindle 18 operating at a speed of 60 rpm) at 20° C. Exemplary second binders may include acrylic binders, among others. The second binder may be present up to about half the weight of the total binder composition (e.g., 1 to 50 wt. %; 1 to 20 wt. %; etc.).

5. Additional Binder Components

The present carbohydrate binder compositions may further include one or more additional components such as adhesion prompters, oxygen scavengers, solvents, emulsifiers, pigments, organic and/or inorganic fillers, flame retardants, anti-migration aids, coalescent aids, curing catalysts, wetting agents, biocides, plasticizers, organosilanes, antifoaming agents, colorants, waxes, suspending agents, antioxidants, and secondary crosslinkers, among other components. In some instances, some or all of the additional components are pre-mixed with the binder composition before it is applied to fibers and cured. In additional instances, some or all of the additional components may be introduced to the curable, curing, and/or cured fiber-containing composite during or after the initial binder composition is applied to the fibers.

Exemplary Fiber-Containing Composites

The viscosity-enhanced carbohydrate binder compositions may be used to make a variety of fiber-reinforced composites, including glass fiber mats for roofing shingles and facers, among other products. FIG. 1 shows an exemplary section of glass fiber mat 100 that may be used, for example, in a roofing shingle.

The glass fibers 102 used in glass fiber mat 100 can have various fiber diameters and lengths, depending on the strength and other properties desired in the mat. Exemplary glass fibers may have diameters in the range of 3 to 25 µm (e.g., 12 to 17 µm), which the collecting of fibers having roughly equal diameters or two or more different-sized diameters. Similarly, the fibers may be roughly equal in length (e.g., 0.75 to 1.25 inches in length), or may have different lengths. In some embodiments, longer fiber lengths (e.g., 3 to 5 inches) may be used in a wet process for making fiber glass mats. Even longer fiber lengths can be used in some dry processes. Generally the longer the fiber, the higher the tensile and strengths of the mat, but the poorer the fiber dispersion.

The glass fibers may be made from a variety of glass types, including E, T and C type glass fibers. Additional types of glass may also be used including A type, S type, etc. Typically, all of the fibers used in the glass fiber mat 100 are glass fibers, while in some instances the mat 100 may include a portion of non-glass fibers. These may include inorganic fibers (e.g., graphite fibers, mineral fibers, etc.) as well as organic fibers such as nylon, polyester, polyethylene, polypropylene, etc. Typically the non-glass fibers will not exceed 25 wt. % of the total fiber weight.

The relative weights of the binder and fibers in the composite may also vary. Typically, the carbohydrate binder weight ranges from 3 wt. % to 45 wt. % of the fiber mat. Conversely, the relative weight of the fibers in the mat typically ranges from 55 wt. % to 97 wt. %.

Exemplary Processes for Making Fiber-Containing Composites

Figure 2:
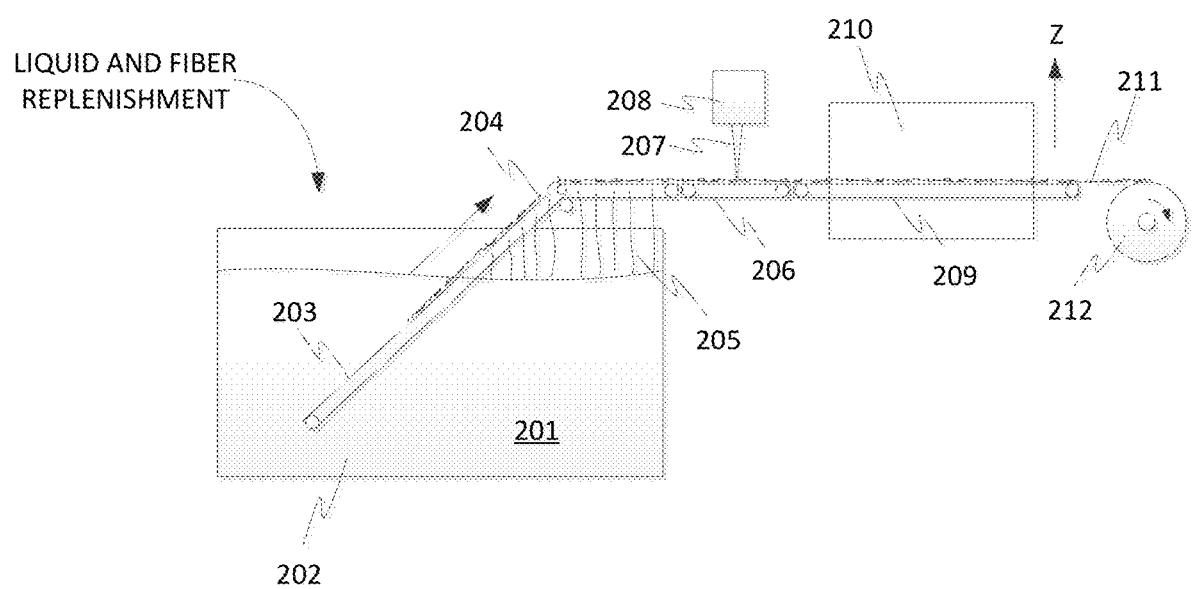
FIG. 2 shows an exemplary system for making glass fiber mats according to embodiments of the invention.

FIG. 2 illustrates a simplified schematic view of one example process for producing a glass fiber mat. In the process of FIG. 2, glass fibers are combined with whitewater 201 to form an aqueous suspension in mixing tank 202. The whitewater 201 may be a water-based mixture for treating the fibers to improve the quality and uniformity of the mat. The whitewater may include one or more thickening agents and/or dispersants that promote the homogeneity and/or cohesion of the fibers in the suspension and subsequently in the mat. Exemplary thickening agents may include hydroxyethyl cellulose, ethoxylated amines, polyacrylamides, and amine oxides, among other thickening agents. The amount of thickening agent used should be effective to provide the viscosity needed to suspend the fibers in the white water as needed to practice the method used to form the wet laid mat. The white water viscosity is generally in the range of 1 to 20 cPs, preferably 1.5 to 8 cPs (e.g., 4 to 5 cPs). The fiber slurry then is agitated to form a workable, uniform dispersion of fibers having a suitable consistency.

The white water may include dispersants, surfactants, lubricants, and defoamers, among other additives. Exemplary dispersants may include cationic surfactants such as ethoxylated tallow amines commercially available as C-61 from Cytec Industries, Inc. of Morristown, N.J. The pH of the suspension may be any acceptable pH for the processing conditions (e.g., less than 7, about 4 to about 7, etc.) and may be adjusted by the addition of acids or bases (e.g., acetic acid).

When fibers of different size are used in the mat, their different lengths and/or diameters may present competing interests to the formulation of the white water chemistry. For example, long, coarse fibers may be more effectively dispersed in a more viscous white water. However, the presence of the fine fibers may make it difficult to remove a relatively viscous white water from the mat in later stages of the wet laid process. The selected white water formulation and fiber mix preferably balance these interests.

Moisture on the glass fibers at the time they are introduced into the wet laid process, especially small diameter fibers, has a strong effect on the uniformity of the finished mat. In particular, introducing the fibers to the wet laid process in an already-wet state improves the dispersion of the fibers in the white water mixture, and results in a more uniform mat. The glass fiber may have, for example, a moisture content of about 5 to 75 percent (e.g., 5 to 35 percent). The wet fiber is then introduced into tank 202 of the wet laid process, for mixing with the white water 201.

A porous first belt 203 lifts fibers 204 from white water 201, and excess liquid 205 is allowed to fall through first belt 203, to return to tank 202. (While excess liquid 205 is shown schematically in FIG. 2 as simply falling back into tank 202, various mechanisms, for example vacuum or other techniques, may be used to facilitate the removal of liquid 205 from fibers 204.) Preferably, tank 202 is replenished with fibers and liquid as needed to maintain a proper mixture of fibers and white water 201 for continuous production.

Fibers 204 may be transferred to a second belt 206, for application of a binder. In FIG. 2, binder 207 is shown as being applied to fibers 204 using a curtain coater 208. Other binder application techniques may be used as well. For example, binder 207 may be sprayed onto fibers 204, or applied by another suitable technique.

Fibers 204, now including binder 207, may then be transferred to a third belt 209 and carried through a drying process 210. Drying process 210 may use heat, airflow, or other techniques to cure the binder composition 207 and to remove moisture from fibers 204. Drum drying/curing can also be used in place of through air drying/curing. After drying, completed mat 211 may be packaged for later use, for example by being wound onto a roll 212.

Many variations are possible. For example, more or fewer belts may be used. In some embodiments, the components of binder 207 may be added to white water 201 so that fibers 204 are infused with binder upon their emergence from tank 202, reducing (and sometimes eliminating) the need for curtain coater 208 or other binder application equipment.

As noted above, the distribution of binder within the finished mat 211 in the Z direction (i.e., vertical direction) as shown in FIG. 2 has a significant effect on the quality and later processing of mat 211. If the binder is not infused throughout mat 211, mat 211 may suffer from poor interlaminar strength. Excessive binder at or near the bottom surface of mat 211 may also interfere with proper bonding of any cover film added later to mat 211. To further facilitate uniform dispersion of the binder within the mat, the present binder compositions include one or more thickening agents to control the viscosity and may also include surfactants to control the surface tension of the composition. In addition, the curing and drying process 210 may be carried out in stages or zones. For example, the first zone or zones of an oven that is part of curing and drying process 210 may be operated at a decreased temperature, slowing the drying of fibers 204 and the migration of binder composition to the heated side of mat 211. Later oven zones are maintained at sufficient temperatures to fully dry and cure mat 211.

EXAMPLES

Figure 3A:
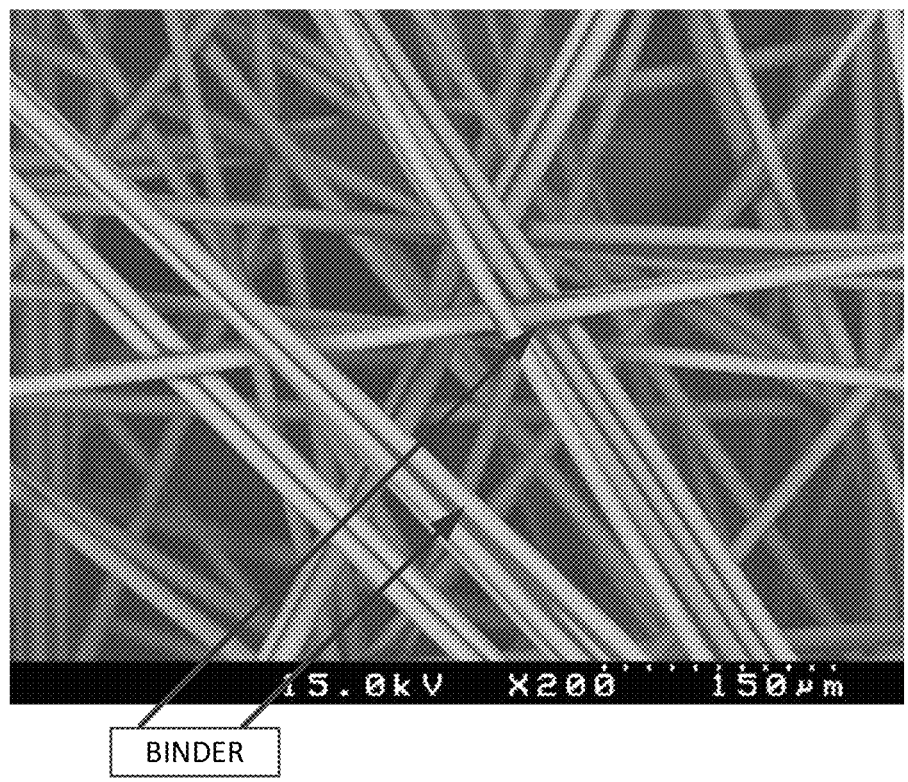
FIG. 3A shows Scanning Electron Microscope (SEM) image of a top layer of a glass fiber mat made with a binder composition that did not have an added thickening agent.
Figure 3B:
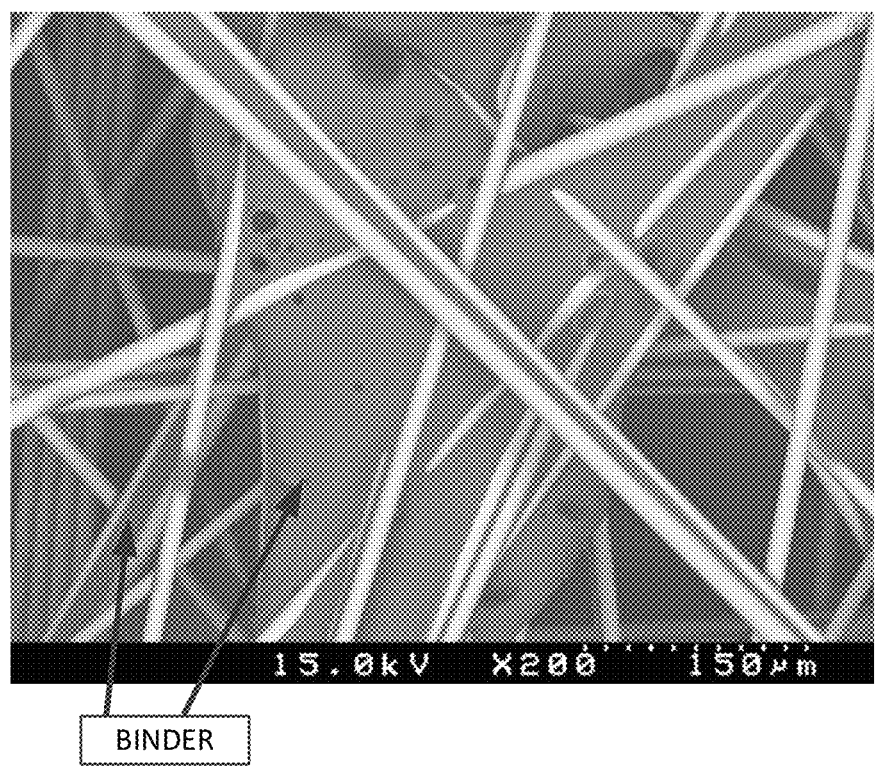
FIG. 3B shows Scanning Electron Microscope (SEM) image of a bottom layer of a glass fiber mat made with a binder composition that did not have an added thickening agent.

Loosely bonded top layers were observed for several carbohydrate binder compositions with no added thickening agents added to non-woven glass mats to make glass fiber mats. FIGS. 3A and 3B show scanning electron microscope images of the top and bottom layers, respectively, of a glass fiber mat made with a carbohydrate-containing binder composition (Binder 2). FIG. 3B shows the bottom layer has significantly more cured binder than the top layer. For a 2.1 lb/sq mat sample, the top and bottom layers were separated and measured for binder content (loss-on-ignition (LOI) percentage). The LOI was 8.9 wt. % for the top layer shown in FIG. 3A, 23.9 wt. % for the bottom layer shown in FIG. 3B, and 21.3 wt. % for the intact glass mat. The mass percentage of the loosely bonded top layer was calculated at approximately 17%.

The observations about the cured binder concentrations in the top and bottom layers of the glass mat indicate that the curtain coated binder composition made a significant migration through the top layer due to its low viscosity. Both gravity and vacuum suction are believed to make significant contributions to the migration of the carbohydrate-containing binder composition through the top layer glass mat. To test this hypothesis, viscosity measurements were performed on binder compositions both with and without added thickening agents.

Viscosity Measurements for Carbohydrate Binder Compositions

Viscosity measurements were taken on two types of carbohydrate binder compositions with and without the addition a thickening agent. Composition viscosities were measured with a Brookfield viscometer (spindle "18") operating at a speed of 60 rpm to provide a shear rate of ~79.2 $s^{-1}$ on composition samples adjusted to 20° C.

The first carbohydrate binder composition, referred to as Binder 1, was diluted to 16 wt. % solids in water. This binder formulation has a molar ratio of [1,6-hexanediamine]:[Maleic anhydride]:Dextrose of 1:1:6, and 5 wt. % of $(NH_4)_2SO_4$ as a catalyst. Additional details about this binder formulation can be found in U.S. patent application Ser. No. 12/539,263, filed Aug. 11, 2009 to Shooshtari, the entire contents of which are herein incorporated by reference for all purposes. The second binder composition, referred to as Binder 2, was diluted to 18 wt. % solids in water. This binder formulation has a molar ratio of Glyoxal:Urea:Dextrose:of 1:1:5, and 5 wt. % $(NH_4)_2SO_4$+5 wt. % $(NH_4)_2HPO_4$ as the catalyst. Additional details about this binder formulation can be found in U.S. patent application Ser. No. 13/490,638, filed Jun. 7, 2012 to Shooshtari et al, the entire contents of which are herein incorporated by reference for all purposes.

Table 1 lists the viscosity measurements for each of the binder compositions:

TABLE 1

| Binder Composition Viscosity Measurements: | |
|---|---|
| Binders (% solids) | Viscosity (in centipoise (cPs)) |
| Binder 1 (16 wt. %) | 1.85 |
| Binder 1 (16 wt. %) + 0.12 wt. % HEC | 13.5 |
| Binder 2 (18 wt. %) | 2.56 |
| Binder 2 (18 wt. %) + 0.14 wt. % HEC | 13.6 |
| Binder 2 (18 wt. %) + 0.08 wt. % Xanthan Gum | 11.8 |

Figure 4A:
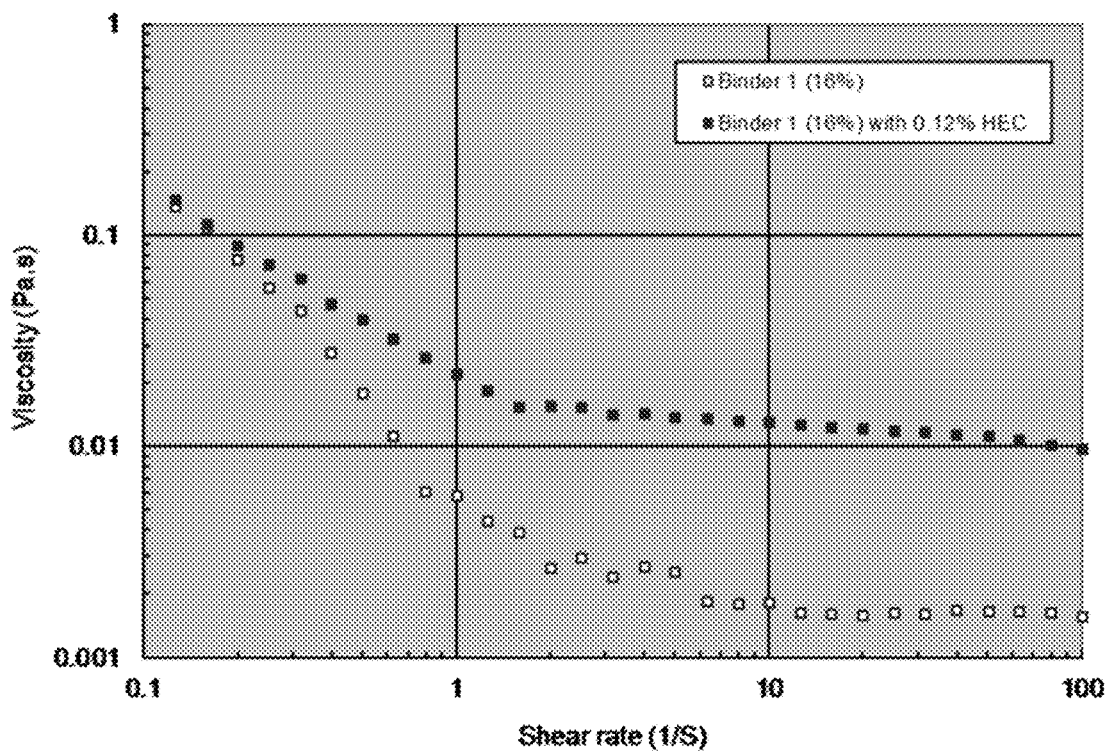
FIG. 4A shows a graph of viscosities versus shear rates for Binder 1 compositions.
Figure 4B:
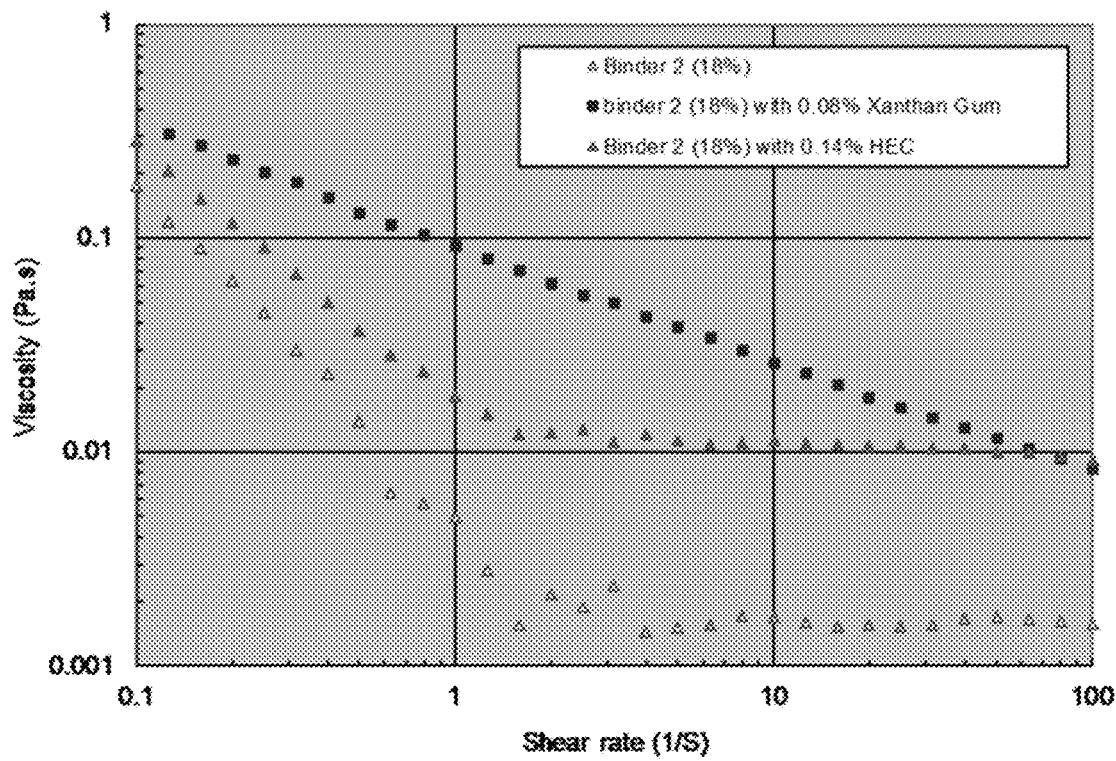
FIG. 4B shows a graph of viscosities versus shear rates for Binder 2 compositions.

The viscosities of the binder compositions were also measured over a range of shear rates with a rheometer. FIGS. 4A and 4B are graphs showing the viscosities at various shear rates for the binder compositions (i.e., Binder 1 and Binder 2) both with and without the thickening agents (e.g., HEC and Xanthan gum). The graphs show that even at low concentration levels, the thickening agents maintain the compositions at higher viscosity levels when they're subjected to increased shear rates.

Property Measurements of Glass Mats Made with the Binder Compositions

Example 1

Glass mats (targeted 1.9-2.3 lb/sq, nominal 2.1 lb/sq, targeted 17-23% LOI, nominal 20%) were made with binder compositions of Binder 2 without an added thickening agent, Binder 2 with 0.14 wt. % HEC, and Binder 2 with 0.08 wt. % Xanthan gum, as described above in Table 1. The same curing temperature were used for each glass mat made with the binder compositions.

The addition of the thickening agents to the binder compositions improved the quality of the glass mats in a number of ways: The reduced migration of the binder composition after its application to the mat resulted in more uniform vertical distribution of the binder between the top and bottom sides of the mat, with no noticeable differences in appearance between the top and bottom sides. The glass mats made with binder compositions having the thickening agents also increased the physical properties like dry tensile strength. These tensile strength measurements are described in Table 2 below:

TABLE 2

Tensile Strengths of Glass Mats (2.1 lb/sq) Made with Binder 2 Compositions

| Binder | Weight (lb/sq) | LOI (%) | Tensile MD (lbs/in) | Tensile CMD (lbs/in) | Total Tensile (lbs/in) | Total Tensile (normalized by 2.1 lb/sq) | | Total Tensile (normalized by 20% LOI) | | H/W Tensile MD (lbs/in) | Hot/Wet retention |
|---|---|---|---|---|---|---|---|---|---|---|---|
| | | | | | | lbs/in | Improvement over Binder 2 | lbs/in | Improvement over Binder 2 | | |
| Binder 2 + 0.14% HEC | 1.95 | 19.2 | 22.3 | 26.1 | 48.4 | 51.98 | 18% | 50.38 | 28% | 19.0 | 85% |
| Binder 2 + 0.08% Xanthan gum | 1.91 | 19.6 | 22.4 | 25.8 | 48.3 | 50.06 | 20% | 49.23 | 25% | 20.2 | 90% |
| Binder 2 | 2.03 | 21.7 | 19.6 | 23.1 | 42.7 | 44.18 | — | 39.6 | — | 15.6 | 80% |

The total tensile strengths results listed in Table 2 represents the sum of tensile strengths on the machine direction (MD) and the cross-machine direction (CMD). Hot/wet tensile strength was measured after the sample was soaked in hot water at 82° C. for 10 minutes. The samples were then dried for at least 3 minutes before the hot/wet tensile strength was tested. Table 2 also lists the hot/wet retention percentage, which is the percentage of hot/wet tensile strength to tensile strength measured at room temperature. This can be an indicator of the degree of crosslinking the cured binder achieves.

The tensile strength data in Table 2 show that the addition of the thickening agents (e.g., HEC or Xanthan gum) increased the total tensile strength by roughly 20% compared to the Binder 2 binder composition with no added thickening agent. The weight % of binder in the loosely bonded mat made with the Binder 2 binder composition lacking an added thickening agent was about 17 wt. %. Thus, the loosely bonded layer did not contribute significantly to the tensile strength. The total tensile strength (normalized by 20% LOI) demonstrated even more improvement. Finally, the hot/wet retention was roughly unchanged, indicating that the thickening agents did not significantly interfere with the crosslinking of the binder composition during curing.

The addition of the thickening agents significantly improved the quality of the glass mats. There was no noticeable difference in the appearance for the top and bottom of the mats that included the thickening agents, and the mats were well bonded. Table 3 shows the measurement results for tensile strengths:

TABLE 3

Tensile Strengths of Glass Mats (1.4 lb/sq) Made with Binder 2 Compositions

| Binder | Weight (lb/sq) | LOI (%) | Tensile MD (lbs/in) | Tensile CMD (lbs/in) | Total Tensile (lbs/in) | Total Tensile (normalized by 2.1 lb/sq) | | Total Tensile (normalized by 20% LOI) | | H/W Tensile MD (lbs/in) | Hot/Wet retention |
|---|---|---|---|---|---|---|---|---|---|---|---|
| | | | | | | lbs/in | Improvement over BINDER 2 | lbs/in | Improvement over BINDER 2 | | |
| Binder 2 + 0.14% HEC | 1.44 | 19.6 | 20.4 | 24.8 | 45.2 | 43.97 | 25% | 43.84 | 26% | 16.8 | 82% |
| Binder 2 + 0.08% Xanthan gum | 1.38 | 21.2 | 19.4 | 21.0 | 40.4 | 41.03 | 17% | 36.17 | 4% | 18.6 | 96% |
| Binder 2 | 1.39 | 18.9 | 15.2 | 19.5 | 34.7 | 35.05 | — | 34.88 | — | 12.1 | 80% |

The tensile strength data in Table 3 show that the addition of the thickening agents (e.g., HEC or Xanthan gum) increased the total tensile strength by roughly 20% compared to the Binder 2 binder composition with no added thickening agent. The hot/wet retention was roughly unchanged, indicating that the thickening agents did not significantly interfere with the crosslinking of the binder composition during curing.

Example 2

A second set of glass mats were made using Binder 2. The glass mats (targeted 1.21-1.56 lb/sq, nominal 1.4 lb/sq, targeted 16-22% LOI, nominal 19%) were made with binder compositions of Binder 2 without an added thickening agent, Binder 2 with 0.14 wt. % HEC, and Binder 2 with 0.08 wt. % Xanthan gum. The same curing temperature was used for all the binders.

Example 3

A third set of glass mats were made using Binder 1. The glass mats (targeted 1.21-1.56 lb/sq, nominal 1.4 lb/sq, targeted 16-22% LOI, nominal 19%) were made with binder compositions of Binder 1 without an added thickening agent, and Binder 1 with 0.12 wt. % HEC, as discussed in Table 1. Table 4 shows the measurement results for tensile strengths:

TABLE 4

Tensile Strengths of Glass Mats (1.4 lb/sq) Made with Binder 1 Compositions

| Binder | Weight (lb/sq) | LOI (%) | Tensile MD (lbs/in) | Tensile CMD (lbs/in) | Total Tensile (lbs/in) | Total Tensile (normalized by 2.1 lb/sq) | | Total Tensile (normalized by 20% LOI) | | H/W Tensile MD(lbs/in) | Hot/Wet retention |
|---|---|---|---|---|---|---|---|---|---|---|---|
| | | | | | | lbs/in | Improvement over Binder 1 | lbs/in | Improvement over Binder 1 | | |
| Binder 1 + 0.12% HEC | 1.39 | 20 | 26.6 | 34.1 | 60.7 | 61.12 | 38% | 57.70 | 38% | 17.2 | 65% |
| Binder 1 | 1.39 | 20 | 19.4 | 24.7 | 44.1 | 44.34 | — | 41.86 | — | 13.9 | 72% |

The tensile strength data in Table 4 show that the addition of the HEC thickening agent increased the total tensile strength by roughly 38% compared to the Binder 1 composition with no added thickening agent. The hot/wet retention was roughly unchanged, indicating that the HEC thickening agent did not significantly interfere with the crosslinking of the binder composition during curing.

Example 4

A fourth set of glass mats were made using a binder composition referred to as Binder 3. The Binder 3 formulation had a molar ratio of triammonium citrate:glucose of 1:6, and also included 5 wt. % $(NH_4)_2SO_4$. Glass mats were made with the Binder 3 composition without an added thickening agent, and with 0.12 wt. % HEC. Table 5 shows the measurement results for tensile strengths:

TABLE 5

Tensile Strengths of Glass Mats (1.36 lb/sq) Made with Binder 3 Compositions with and without a Thickening Agent

| Binder | Weight (lbs/sq) | LOI (%) | Tensile MD (lbs/inch) | Tensile CMD (lbs/inch) | Total Tensile (lbs/inch) | Total tensile (normalized by 16.6% LOI) | |
|---|---|---|---|---|---|---|---|
| | | | | | | lbs/in | Improvement with HEC |
| Binder 3 | 1.36 | 14.9 | 11.5 | 15.1 | 26.6 | 29.7 | — |
| Binder 3 with 0.12% HEC | 1.36 | 16.6 | 18.5 | 19.8 | 38.3 | 38.3 | 29% |

Example 5

A fifth set of glass mats were made with a blend of a carbohydrate-based binder composition (e.g., Binder 2) and a second binder composition with higher viscosity. The second binder composition is a solution polymer of Acrodur 950L from BASF that has a Brookfield viscosity of 900-2500 cPs (spindle 18 operating at a speed of 60 rpm) at 23° C. Alternatively, Acrodur DS3515 latex binder composition from BASF may also be used as the second binder composition. Table 6 compares mat properties for mats made with a blended binder composition of Binder 2 and Acrodur 950L, and those made with an unblended Binder 2 composition:

TABLE 6

Tensile Strengths of Glass Mats (1.4 lb/sq) Made with Binder 2 Compositions with and without a Second Binder

| Binder | Weight (lbs/sq) | LOI (%) | Tensile MD (lbs/inch) | Tensile CMD (lbs/inch) | Total Tensile (lbs/inch) | Total tensile (normalized by 1.4 lb/sq) | | Total tensile (normalized by 19% LOI) | |
|---|---|---|---|---|---|---|---|---|---|
| | | | | | | lbs/in | Improvement over Binder 2 | lbs/in | Improvement over Binder 2 |
| Binder 2/ Acrodur 950L (80/20) | 1.36 | 19.2 | 20.0 | 24.5 | 44.5 | 45.83 | 31% | 44.06 | 26% |
| Binder 2 | 1.39 | 18.9 | 15.2 | 19.5 | 34.7 | 35.05 | — | 34.88 | — |

The blending significantly increases the viscosity of the carbohydrate-based binder and improves the surface quality of the glass mat. These improvements are attributed at least in part to a more uniform coating of the blended binder composition on the non-woven glass fiber substrate, especially in the vertical direction (i.e., z-direction).

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A carbohydrate binder composition comprising a reducing sugar, a nitrogen-containing compound, and a thickening agent, wherein:
    the nitrogen-containing compound is a reaction product of urea ($H_2N-CO-NH_2$) and glyoxal,
    the binder composition has a Brookfield viscosity of 7 to 50 centipoise at 20° C. as measured with a Brookfield viscometer using spindle 18 at 60 rpm,
    the binder composition is formaldehyde-free and forms a polymerization product, and
    the thickening agent has a concentration of 0.03 wt. % to 0.3 wt. % of the binder composition.

2. The carbohydrate binder composition of claim 1, wherein the reducing sugar is chosen from dextrose, fructose, allose, galactose, xylose, ribose, maltose, cellobiose, and lactose.

3. The carbohydrate binder composition of claim 1, wherein the reaction product comprises 4,5-dihydroxyimidazolidin-2-one.

4. The carbohydrate binder composition of claim 1, wherein the binder composition further comprises a reaction product of an organic anhydride and an alkanol amine.

5. The carbohydrate binder composition of claim 1, wherein the thickening agent comprises a modified cellulose.

6. The carbohydrate binder composition of claim 5, wherein the modified cellulose is chosen from carboxymethyl cellulose (CMC), and hydroxyethyl cellulose (HEC).

7. The carbohydrate binder composition of claim 1, wherein the thickening agent comprises a polysaccharide.

8. The carbohydrate binder composition of claim 7, wherein the polysaccharide is chosen from xanthan gum, guar gum, and starch.

9. The carbohydrate binder composition of claim 1, wherein the thickening agent comprises acrylic acid.

10. The carbohydrate binder composition of claim 1, wherein:
    the reducing sugar comprises dextrose;
    the nitrogen-containing compound is 4,5-dihydroxyimidazolidin-2-one; and
    the thickening agent comprises hydroxyethyl cellulose, wherein the hydroxyethyl cellulose has a concentration of 0.05 wt. % to 0.3 wt. % of the binder composition.

11. The carbohydrate binder composition of claim 1, wherein:
    the reducing sugar comprises dextrose;
    the nitrogen-containing compound is 4,5-dihydroxyimidazolidin-2-one; and
    the thickening agent comprises xanthan gum, wherein the xanthan gum has a concentration of 0.03 wt. % to 0.2 wt. % of the binder composition.

12. A blended carbohydrate binder composition comprising a reducing sugar, a nitrogen-containing compound, and a second binder composition, wherein:
    the nitrogen-containing compound is a reaction product of urea ($H_2N-CO-NH_2$) and glyoxal,
    the blended carbohydrate binder composition has a Brookfield viscosity of 7 to 50 centipoise at 20° C. as measured with a Brookfield viscometer using spindle 18 at 60 rpm,
    the second binder composition is formaldehyde-free and forms a polymerization product, and
    the blended carbohydrate binder composition comprises a thickening agent at a concentration from 0.03 wt. % to 0.3 wt. % of the blended carbohydrate binder composition.

13. The blended carbohydrate binder composition of claim 12, wherein the second binder composition is selected from the group consisting of a latex binder composition and a solution polymer binder composition.

14. The carbohydrate binder composition of claim 1, wherein the binder composition is an aqueous solution.

15. The blended carbohydrate binder composition of claim 12, wherein the second binder composition is a solution polymer binder composition.

16. The carbohydrate binder composition of claim 1, wherein the molar ratio of the nitrogen-containing compound to the reducing sugar is in a range from 1:4 to 1:10.

* * * * *